US009019896B2

(12) United States Patent
Jafarian et al.

(10) Patent No.: US 9,019,896 B2
(45) Date of Patent: Apr. 28, 2015

(54) SYSTEMS AND METHODS FOR LOW OVERHEAD PAGING

(71) Applicant: QUALCOMM Incorporated, San Diego, CA (US)

(72) Inventors: Amin Jafarian, San Diego, CA (US); Alfred Asterjadhi, Breukelen (NL); Peyman Razaghi, San Diego, CA (US); Simone Merlin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 125 days.

(21) Appl. No.: 13/737,838

(22) Filed: Jan. 9, 2013

(65) Prior Publication Data
US 2013/0279405 A1 Oct. 24, 2013

Related U.S. Application Data

(60) Provisional application No. 61/637,200, filed on Apr. 23, 2012.

(51) Int. Cl.
H04W 68/02 (2009.01)
H04W 28/06 (2009.01)

(52) U.S. Cl.
CPC .............. *H04W 68/02* (2013.01); *H04W 28/06* (2013.01)

(58) Field of Classification Search
USPC ........... 360/121, 317, 319; 370/328; 382/166, 382/232
See application file for complete search history.

(56) References Cited

U.S. PATENT DOCUMENTS

| 5,197,101 | A * | 3/1993 | Mok .............................. 704/500 |
| 6,580,523 | B1 * | 6/2003 | Yoshimoto et al. ............ 358/1.4 |
| 7,737,870 | B1 * | 6/2010 | Wang ............................... 341/65 |
| 7,894,836 | B1 * | 2/2011 | Fuoss et al. .................... 455/466 |
| 8,005,492 | B2 | 8/2011 | Yang et al. |
| 8,484,673 | B2 * | 7/2013 | Moreillon ........................ 725/31 |
| 8,488,691 | B2 * | 7/2013 | Chrabieh et al. .............. 375/260 |

(Continued)

FOREIGN PATENT DOCUMENTS

| EP | 1530384 A2 | 5/2005 |
| EP | 1892968 A1 | 2/2008 |

(Continued)

OTHER PUBLICATIONS

IEEE Std 802.11-2007.*

(Continued)

Primary Examiner — Melvin Marcelo
Assistant Examiner — Peter Solinsky
(74) Attorney, Agent, or Firm — James K. O'Hare

(57) ABSTRACT

Systems, methods, and devices for low overhead paging in a wireless communications network are described herein. In one aspect, a wireless communications device comprises a processor and a transmitter. The processor is configured to compress a bitmap of a paging message to obtain a compressed paging message. The bitmap is associated with a plurality of receiver identifiers, and each of the plurality of receiver identifiers associated with at least one receiver of a set of receivers. The compressed bitmap comprises a block bitmap and a plurality of sub-block bitmaps. Each bit of the block bitmap comprises a logical OR of a subset of the bitmap, and each sub-block bitmap corresponds to a bit of the block bitmap. The transmitter is electronically coupled with the processor and configured to transmit the compressed paging message to at least one receiver.

63 Claims, 12 Drawing Sheets

(56) References Cited

U.S. PATENT DOCUMENTS

| | | | |
|---|---|---|---|
| 2006/0034274 A1 | 2/2006 | Kakani et al. | |
| 2006/0285485 A1 | 12/2006 | Agrawal et al. | |
| 2009/0016353 A1 | 1/2009 | Li et al. | |
| 2009/0067379 A1* | 3/2009 | Kim et al. | 370/329 |
| 2010/0157955 A1* | 6/2010 | Liu et al. | 370/336 |
| 2010/0219991 A1* | 9/2010 | Tang | 341/55 |
| 2010/0257373 A1* | 10/2010 | Motoyama | 713/189 |
| 2011/0172992 A1* | 7/2011 | Shin et al. | 704/201 |
| 2011/0200059 A1* | 8/2011 | Tavallaei | 370/476 |
| 2012/0113794 A1* | 5/2012 | Roman et al. | 370/201 |
| 2012/0309441 A1* | 12/2012 | Eriksson et al. | 455/509 |
| 2013/0114583 A1* | 5/2013 | Park et al. | 370/338 |
| 2013/0128798 A1* | 5/2013 | Liu | 370/312 |
| 2013/0128831 A1* | 5/2013 | Calcev et al. | 370/329 |
| 2013/0142184 A1* | 6/2013 | Wang | 370/338 |
| 2013/0155930 A1* | 6/2013 | Chu et al. | 370/311 |
| 2013/0208667 A1* | 8/2013 | Merlin et al. | 370/329 |
| 2013/0229959 A1* | 9/2013 | Ghosh et al. | 370/311 |
| 2013/0279381 A1* | 10/2013 | Sampath et al. | 370/311 |
| 2013/0291005 A1* | 10/2013 | Moreillon | 725/29 |
| 2013/0310016 A1* | 11/2013 | Park et al. | 455/418 |
| 2013/0329620 A1* | 12/2013 | Kim et al. | 370/311 |
| 2014/0010144 A1* | 1/2014 | Liu et al. | 370/312 |
| 2014/0029600 A1* | 1/2014 | Kim et al. | 370/338 |
| 2014/0031063 A1* | 1/2014 | Park et al. | 455/456.1 |
| 2014/0106806 A1* | 4/2014 | Frenger et al. | 455/509 |
| 2014/0146678 A1* | 5/2014 | Merlin et al. | 370/235 |
| 2014/0153469 A1* | 6/2014 | Park et al. | 370/311 |

FOREIGN PATENT DOCUMENTS

| | | |
|---|---|---|
| EP | 2157707 A1 | 2/2010 |
| WO | 2006138556 | 12/2006 |
| WO | 2006138625 A2 | 12/2006 |
| WO | 2013052076 A1 | 4/2013 |

OTHER PUBLICATIONS

IEEE 802.11-12/0370r0, Jan. 2012.*
International Search Report and Written Opinion—PCT/US2013/036815—ISA/EPO—Jun. 26, 2013.

* cited by examiner

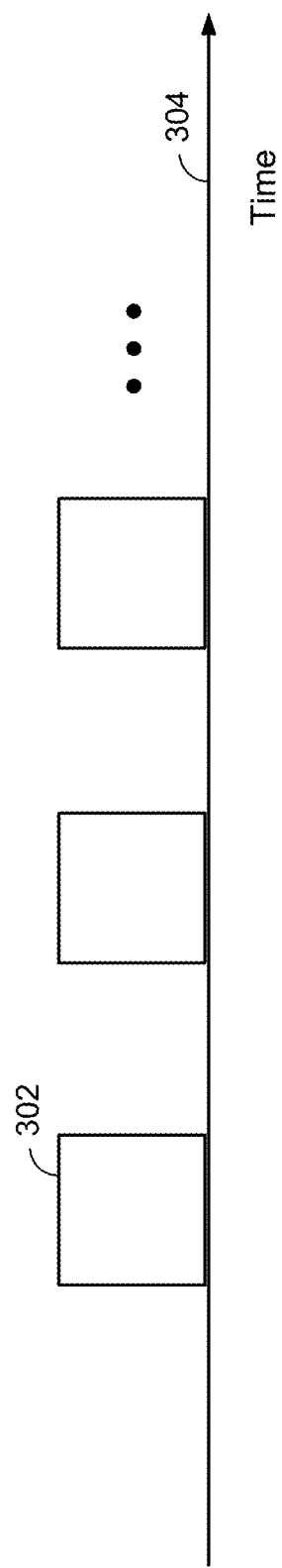

Original TIM: 0 1 0 0 0 1 1 0 0 0 1 0 0 1 1 0

| 0 | 1 | 0 | 0 |
| 0 | 1 | 1 | 0 |
| 0 | 0 | 1 | 0 |
| 0 | 1 | 1 | 0 |

SYSTEMS AND METHODS FOR LOW OVERHEAD PAGING

CLAIM OF PRIORITY UNDER 35 U.S.C. §119

The present Application for Patent claims priority to Provisional Application No. 61/637,200 entitled "SYSTEMS AND METHODS FOR LOW OVERHEAD PAGING" filed Apr. 23, 2012, and assigned to the assignee hereof and hereby expressly incorporated by reference herein.

BACKGROUND

1. Field

The present application relates generally to wireless communications, and more specifically to systems, methods, and devices for performing low overhead paging in a wireless communication network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. Further, devices that are not actively transmitting/receiving information in the wireless network may enter a doze state to conserve power, where the devices do not actively transmit/receive information in the doze state. These devices may further utilize paging messages to determine when to wake up from a doze state and enter an awake state in order to transmit/receive data. Thus, improved systems, methods, and devices for transmitting and processing paging messages are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

One aspect of this disclosure provides a wireless communications device comprising: a processor configured to compress a bitmap of a paging message to obtain a compressed paging message, the bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap; and a transmitter electronically coupled with the processor and configured to transmit the compressed paging message to at least one receiver.

Another aspect of this disclosure provides a wireless communications device comprising: a receiver electronically coupled with a processor and configured to receive a compressed paging message from a transmitter; and a processor configured to process a compressed bitmap of the compressed paging message, the compressed bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap.

One aspect of this disclosure provides a method for wireless communications comprising: compressing a bitmap of a paging message to obtain a compressed paging message, the bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap; and transmitting the compressed paging message to at least one receiver.

Another aspect of this disclosure provides a method for wireless communications comprising: receiving a compressed paging message from a transmitter; and processing a compressed bitmap of a compressed paging message, the compressed bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap.

One aspect of this disclosure provides an apparatus for wireless communications comprising: means for compressing a bitmap of a paging message to obtain a compressed paging message, the bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap; and means for transmitting the compressed paging message to at least one receiver.

Another aspect of this disclosure provides an apparatus for wireless communications comprising: means for receiving a compressed paging message from a transmitter; and means for processing a compressed bitmap of a compressed paging message, the compressed bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap.

One aspect of this disclosure provides a non-transitory computer storage that stores executable program instructions that direct a wireless communications device to perform a process that comprises: compressing a bitmap of a paging message to obtain a compressed paging message, the bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap; and transmitting the compressed paging message to at least one receiver.

Another aspect of this disclosure provides a non-transitory computer storage that stores executable program instructions that direct a wireless communications device to perform a process that comprises: receiving a compressed paging message from a transmitter; and processing a compressed bitmap of a compressed paging message, the compressed bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap.

BRIEF DESCRIPTION OF THE DRAWINGS

FIG. 3 a plurality of partitioned paging messages transmitted by an access point to wireless stations in the wireless communication system of FIG. 1.

DETAILED DESCRIPTION

Figure 1:
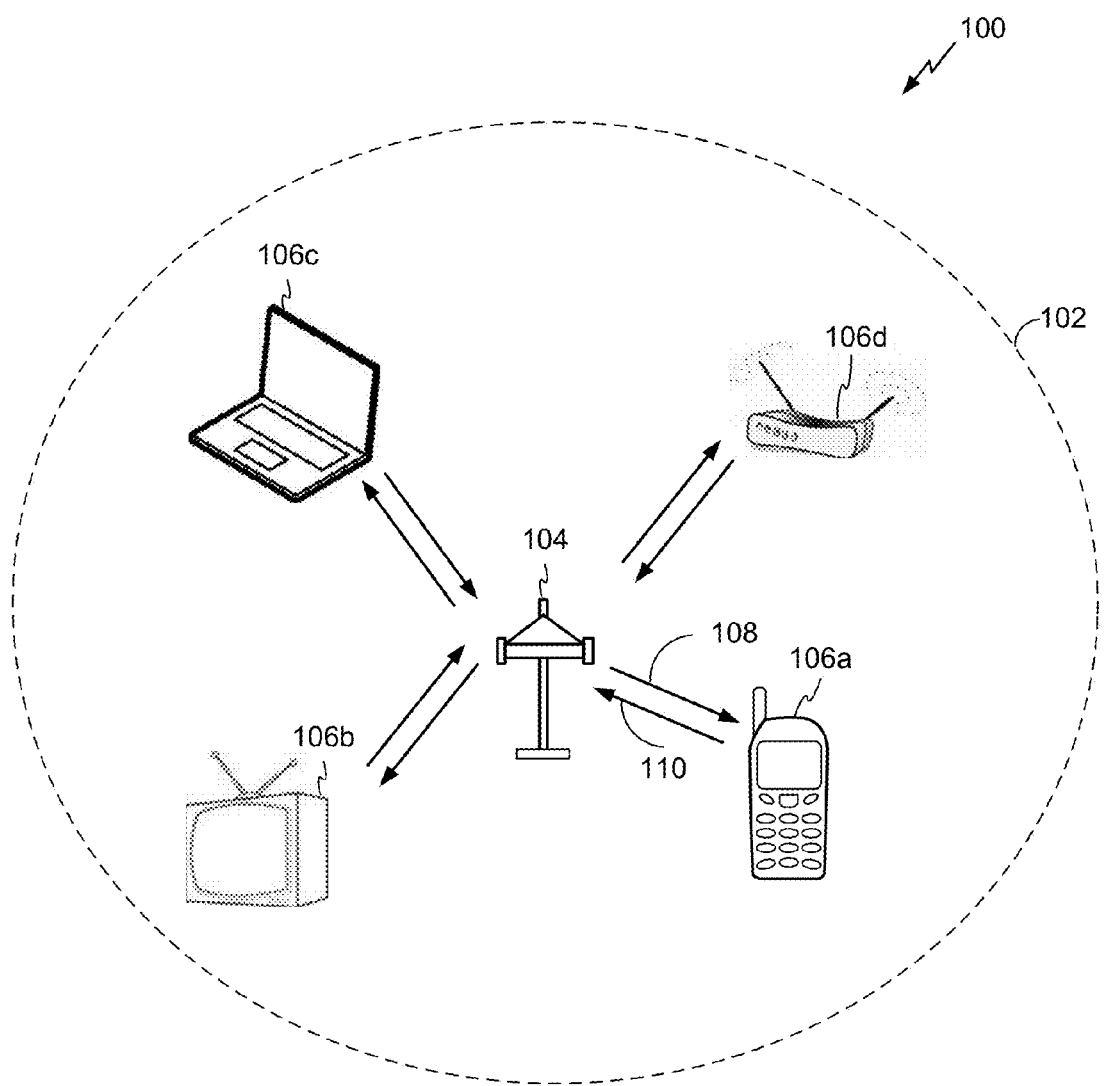
FIG. 1 shows an example wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
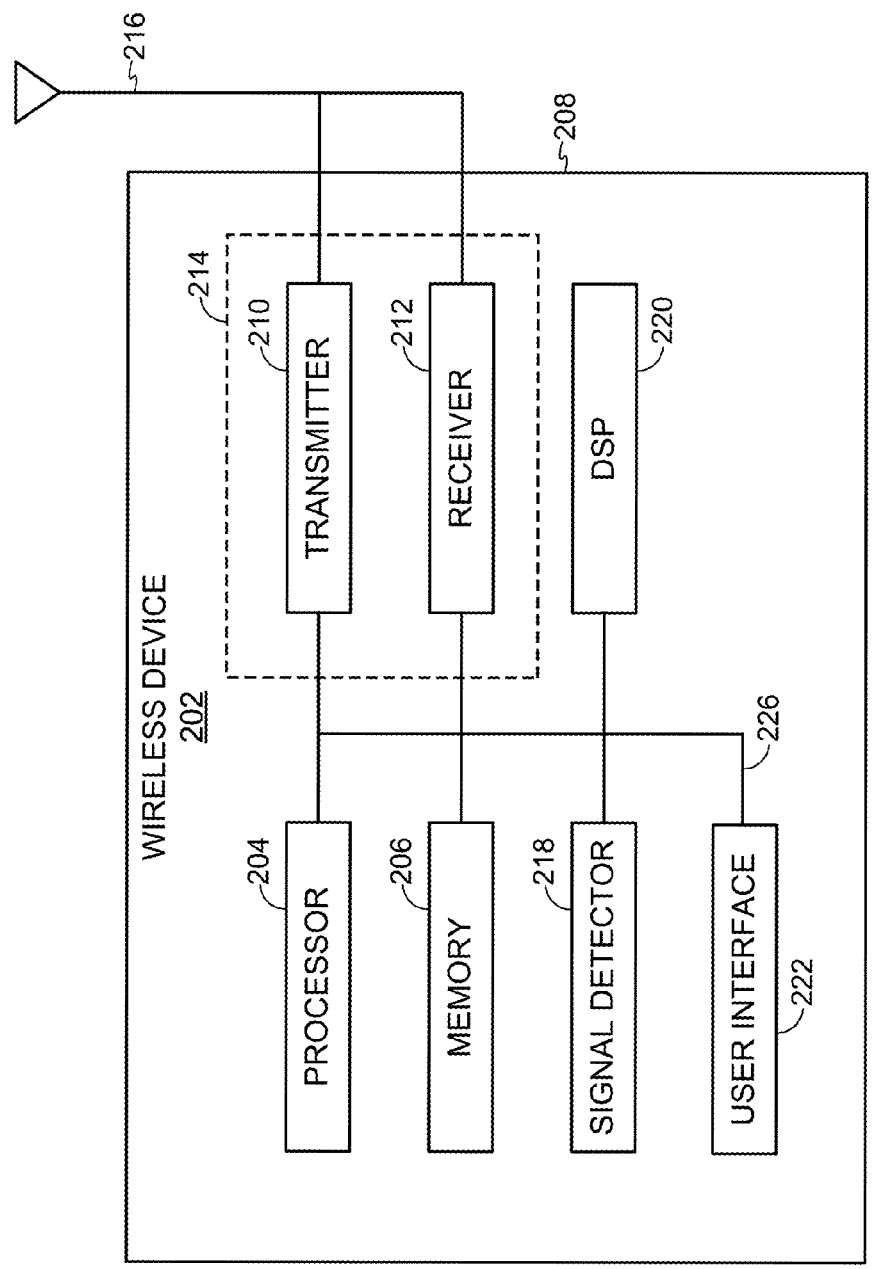
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages, which may be referred to as "paging messages" that are configured to indicate to wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages.

The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106, and may be used to transmit and/or receive communications including paging messages. That is, either AP 104 or STA 106 may serve as transmitter or receiver devices of paging messages. Certain aspects contemplate signal detector 218 being used by software running on memory 206 and processor 204 to detect the presence of a transmitter or receiver.

The STA 106 may have a plurality of operational modes. For example, the STA 106 may have a first operational mode referred to as an active mode. In the active mode, the STA 106 may always be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212 and possibly DSP 220 and signal detector 218 of the STA 106 may operate using reduced power consumption in the doze state. Further, in the power save mode, the STA 106 may occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 may transmit paging messages to a plurality of STAs 106 in a power save mode in the same network as the AP 104, indicating whether or not the STAs 106 need to be in an awake state or a doze state. For example, if an STA 106 determines it is not being paged it may remain in a doze state. Alternatively, if the STA 106 determines it may be paged, the STA 106 may enter an awake state for a certain period of time to receive the page and further determine when to be in an awake state based on the page. Further, the STA 106 may stay in the awake state for a certain period of time after receiving the page. In another example, the STA 106 may be configured to function in other ways when being paged or not being paged that are consistent with this disclosure. For example, the page may indicate that the STA 106 should enter an awake state for a certain period of time because the AP 104 has data to transmit to the STA 106. The STA 106 may poll the AP 104 for data by sending the AP 104 a polling message when in the awake state for the period of time. In response to the polling message, the AP 104 may transmit the data to the STA 106. As another example, a STA may enter a doze state after an AP concludes transmission of a paging message or once the STA determines that the STA has not been paged by the paging message. The STA may then awake when the STA may start contending for the medium or transmit any message as discussed in this disclosure.

In some aspects, paging messages may comprise a bitmap (not shown in this figure), such as a traffic identification map (TIM). In certain such aspects, the bitmap may comprise a number of bits. These paging messages may be sent from the AP 104 to STAs 106 in a beacon or a TIM frame. Each bit in the bitmap may correspond to a particular STA 106 of a plurality of STAs 106, and the value of each bit (e.g., 0 or 1) may indicate the state the corresponding STA 106 should be in (e.g., doze state or awake state). Accordingly, the size of the bitmap may be directly proportional to the number of STAs 106 in the wireless communications system 100. Therefore, a large number of STAs 106 in the wireless communications system 100 may result in a large bitmap. Therefore, a paging message, and in some cases the beacon or TIM frame including the paging message, may be quite large, requiring a great deal of bandwidth to transmit. Further, each STA 106 may need to listen to the entire paging message, and in some cases the beacon or TIM frame including the paging message, in order to determine the state in which it should operate. Accordingly, certain aspects discussed herein relate to techniques for low overhead paging, whereby the STAs 106 selectively decode or listen to only certain paging messages from the AP 104.

In certain aspects related to techniques for low overhead paging, each STA 106 of the plurality of STAs 106 in the wireless communication system 100 is assigned at least one power save identifier (PS ID). Each STA 106 may be assigned one or more such PS IDs. Further, a single PS ID may be assigned to one or more STAs 106. Accordingly, one or more STAs 106 may be addressed by a given PS ID. Further, a given STA 106 may be addressed by one or more PS IDs. In some aspects, the PS IDs may be assigned to STAs 106 during initialization of each STA 106 (e.g., at the time of manufacture of the STA 106, at the first run time of the STA 106, when an STA 106 join a new wireless network such as wireless communication system 100, etc.). In some aspects, the PS IDs may be assigned or additionally revised, such as through communication with other devices in the wireless communication system 100, such as the AP 104. In some aspects, the AP 104 may determine or assign PS IDs for the STAs 106 associated with the AP 104 and transmit messages indicative of the PS IDs to the STAs 106.

All of the PS IDs assigned to the STAs 106 in the wireless communication system 100 may be referred to as a set of PS IDs for the wireless communication system 100 (or alternatively for the AP 104). This set of PS IDs may be divided into a plurality of PS ID subsets, each subset including one or more of the PS IDs in the set of PS IDs. These PS ID subsets may be disjoint or overlapping, meaning that in certain aspects a plurality of the PS ID subsets may include the same PS ID, and in certain aspects one subset may include a PS ID that another subset does not include. Further, the PS ID subsets may be of the same or different sizes, meaning they contain the same or different numbers of PS IDs. Further, some PS ID subsets may include a continuous interval of PS IDs (such as a sequential series of PS IDs), while some PS ID subsets may include PS IDs that do not form a continuous interval. In one aspect, a PS ID subset may include the entire set of PS IDs. Such a subset may be referred to as a broadcast PS ID subset. In certain aspects, similar to how the STA 106 may be assigned a PS ID so that the STA 106 is aware of its PS ID as discussed above, the STA 106 may be assigned or given information to identify the PS ID subsets the STA 106 is associated with as discussed below.

The AP 104 may utilize the PS ID and PS ID subsets along with paging messages as discussed below to enable the STAs 106 to selectively receive only certain paging messages from the AP 104.

In certain aspects, a STA may have an association identifier (AID). The AID may be distinct from the one or more PS IDs of the STA. The AID may identify the STA within an area such as a BSS, may be used as an address or a part of an address, and may be shorter than other addresses of the STA such as an IP address or a MAC address. The AID may be included in a frame to uniquely identify a sender or receiver of a message. For example, the AID may be included in a MAC header to identify a transmitting STA when the AID may be used for addressing a frame. Further, a PPDU header may include an AID or a partial AID that may be used as an early indication of an intended receiver of the frame. Advantageously, such a PPDU header may permit early termination of processing a received PPDU that is indicated to be for different receiver. In some aspects, the AID may be assigned at initialization of each STA (e.g., at manufacture or when a STA joins a wireless network).

A STA may have both an AID and one or more PS IDs as discussed in this disclosure. For instance, one PS ID may relate to a power save wake-up schedule or a schedule at which an associated TIM is transmitted by an AP. Further, if the power save wake-up schedule of the STA changes, a different PS ID may be assigned to the STA.

In some aspects, paging messages may include a token number. The token number may serve as an identifier of a paging message. A STA paged by a paging message with a token number may respond with a power save poll request message (PS-POLL) that also includes the token number. The token number accordingly may enable an AP to identify the PS-POLL as corresponding to the paging message. Advantageously, the token number may be used as an identifier for the paging message sender and permit the PS-POLL sender to transmit less data in the PS-POLL since the address of the sender or receiver may not be transmitted, for example.

The token number included in paging messages may vary from one paging message to subsequent paging messages. The token number may change for instance based on a number of STAs in the BSS, a formula, or a random generation procedure. Advantageously, changing the token number more frequently may prevent issues with overlapping BSSs where each BSS utilizes token numbers or similar approaches.

FIG. 3 illustrates a plurality of partitioned paging messages 302 transmitted by the AP 104 to STAs 106 in the wireless communication system 100 of FIG. 1. As shown, time increases horizontally across the page over the time axis 304. As shown, the AP 104 is configured to transmit a plurality of paging messages 302. The paging messages 302 may be sent in a TIM frame, a beacon, or using some other appropriate signaling. The STAs 106 may be configured to listen to one or more of the paging messages 302 as follows.

In one aspect, each paging message 302 may include one or more identifiers (e.g., a subset identifier) of the PS ID subset(s) for which the paging message 302 is intended. In one aspect, the subset identifier may be a 2 byte field capable of indexing $2^{16}$ PS ID subsets. In another aspect, the subset identifier might be included in a physical layer (PHY) preamble of the paging message 302. The STAs 106 may be assigned or given information about the subset identifier(s) that refer to PS ID subsets which the STAs 106 are associated with. Accordingly, STAs 106 may receive the paging message 302. Using the subset identifier(s) in the paging message 302, the STAs 106 may determine whether the paging message 302 is potentially intended for the STA 106. For example, if the paging message 302 includes a subset identifier for a PS ID subset the STA 106 is associated with, the STA 106 determines the paging message 302 is potentially intended for the STA 106. Further, if the paging message 302 does not include a subset identifier for a PS ID subset the STA 106 is associated with, the STA 106 determines the paging message 302 is not intended for the STA 106.

In another aspect, the AP 104 may be configured to transmit N paging messages 302 in sequence (where N is any positive integer), in order to page the STAs 106 at a given time. Accordingly, each paging message 302 in the sequence may be associated with a sequence number n in the N paging messages (n=1, . . . , N). Each sequence number n may be associated with one or more PS ID subsets.

Accordingly, the STA 106 may determine the paging message 302 is potentially intended for the STA 106 based on the sequence number n of the paging message 302. For example, if the sequence number n of the paging message 302 is associated with a PS ID subset that includes a PS ID of the STA 106, the STA 106 determines the paging message 302 is potentially intended for the STA 106. Further, if the sequence number n of the paging message 302 is not associated with a PS ID subset that includes a PS ID of the STA 106, the STA 106 determines the paging message 302 is not intended for the STA 106.

In certain aspects, similar to how the STA 106 may be assigned a PS ID so that the STA 106 is aware of its PS ID as discussed above, the STA 106 may be assigned or given information regarding the association between sequence numbers and PS ID subsets, e.g., the sequence number(s) n of the paging message(s) for the PS ID subset(s) to which STA 106 belongs will be transmitted and the STA 106 should listen for. Further, in certain aspects, the assignment of PS ID subsets to sequence numbers may be performed by a coordinating device of the wireless communication system 100, such as the AP 104. In certain other aspects, PS ID subsets are associated with a PS ID subset identifier. Further, the STA 106 may determine whether a PS ID subset is associated with a sequence number n based on the PS ID subset identifier. For example, if the value of the PS ID subset identifier of the PS ID subset equals mod(n, 256) the PS ID subset is associated with the sequence number n. If the value of the PS ID subset identifier of the PS ID subset does not equal mod(n, 256) the PS ID subset is not associated with the sequence number n.

In another aspect, the AP 104 may be configured to transmit paging messages 302 at certain times (e.g., at specific time intervals, which may repeat periodically). Accordingly, each paging message 302 may be associated with a particular time interval. Each time interval may be associated with one or more PS ID subsets.

Accordingly, the STA 106 may determine the paging message 302 is potentially intended for the STA 106 based on the time interval during which the paging message 302 is transmitted. For example, if the time interval of the paging message 302 is associated with a PS ID subset that includes a PS ID of the STA 106, the STA 106 determines the paging message 302 is potentially intended for the STA 106. Further, if the time interval of the paging message 302 is not associated with a PS ID subset that includes a PS ID of the STA 106, the STA 106 determines the paging message 302 is not intended for the STA 106.

In certain aspects, similar to how the STA 106 may be assigned a PS ID so that the STA 106 is aware of its PS ID as discussed above, the STA 106 may be assigned or given information regarding the association between time intervals and PS ID subsets, e.g., at which timer interval the paging message(s) for the PS ID subset(s) to which STA 106 belongs will be transmitted and the STA 106 should listen for. Further, in certain aspects, the assignment of PS ID subsets to time intervals may be performed by a coordinating device of the wireless communication system 100, such as the AP 104.

Using the aspects discussed above, the STA 106 may determine whether a given paging message 302 is potentially intended for the STA 106. Once the STA 106 determines the paging message 302 is potentially intended for the STA 106, the STA 106 may further determine whether the paging message 302 is actually intended for the STA 106 and the state the STA 106 should operate in based on the content of the paging message 302 as discussed below.

Figure 4A:
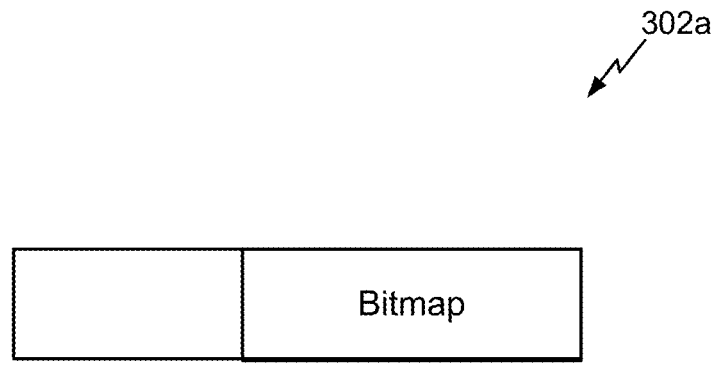
FIG. 4a-4c illustrate example paging messages of FIG. 3.

FIG. 4a illustrates an exemplary paging message 302a. As shown, the paging message 302a includes a bitmap of N bits (where N is any positive integer). Each bit in the bitmap may correspond to a particular PS ID or STA 106 of the STAs 106 that are associated with the PS ID subset(s) associated with the paging message 302a. Further, the value of each bit (e.g., 0 or 1) may indicate the state the corresponding STA 106 with such a PS ID should be in (e.g., doze or awake). Accordingly, the STA 106 may determine its operational state by determining the value of its corresponding bit in the bitmap.

In certain aspects, similar to how the STA 106 may be assigned a PS ID so that the STA 106 is aware of its PS ID as discussed above, the STA 106 may be assigned or given information regarding which bit position(s) in the bitmap is associated with the PS ID(s) of the STA 106. For example, associations between bit positions and PS IDs may be set by the AP 104 or another device in the wireless communication system 100 and communicated to the STA 106 via a message, e.g., a management message.

In other aspects, the PS ID subsets may be assigned PS ID subset identifiers that represent a starting address for each of the PS IDs in the PS ID subset (e.g., if the PS IDs in a PS ID subset are sequential (e.g., 101, 102, 103, 104, etc.) the PS ID subset identifier may be, for example, 10). Accordingly, the remaining portion of a PS ID that is not part of the PS ID identifier may be used as an index to the bitmap. Thus, a STA 106 may use associated PS ID(s) and index the bitmap to determine the intended operation state of the STA 106. For example, based on the above example, if the STA 106 is associated with PS ID 101, it may look for the value of the bit at position 1 in the bitmap to determine the intended operation state of the STA 106. In some aspects, the bit in position N of the bitmap refers to the STAs 106 with a PS ID=N+256*PS ID subset identifier.

Figure 4B:
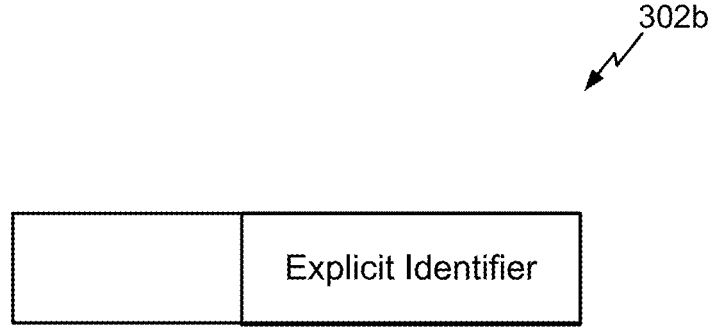

FIG. 4b illustrates another exemplary paging message 302b. In one aspect, the paging message 302b may include an explicit identifier of the PS ID(s) (or some other identifier of STAs 106 such as a local or global internet protocol (IP) address, or a local or global media access control (MAC) address, of the STAs 106) for which the paging message 302b is actually intended. Based on the explicit identifier, a STAs 106 that is associated with the PS ID subset(s) associated with the paging message 302b that has determined as above that the paging message 302b is potentially intended for the STA 106 may further determine if the paging message 302b is actually intended for the STA 106. For example, if the paging message 302b includes an explicit identifier of a PS ID associated with the STA 106, the STA 106 determines the paging message is actually intended for the STA 106. If the paging message 302b does not include an explicit identifier of a PS ID (e.g., the PS ID) associated with the STA 106, the STA 106 determines the paging message is not actually intended for the STA 106.

Figure 4C:
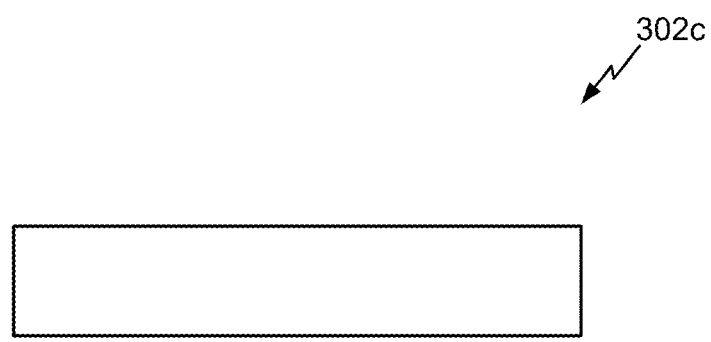

FIG. 4c illustrates yet another exemplary paging message 302c. In one aspect, the paging message 302c may include no explicit indication of the PS IDs associated with STAs 106 that are meant to be paged. Rather, the STAs 106 that are associated with the PS ID subset(s) associated with the paging message 302c may automatically assume the paging message 302c is actually intended for the STAs 106. Accordingly, the paging message 302c is actually intended for all PS IDs in the PS ID subset(s) associated with the paging message 302c. Therefore, in one aspect, a single bit may be included in the paging message 302c to indicate the operational state (e.g., awake or doze) of all STAs 106 associated with the PS ID subset(s) associated with the paging message 302c. In one aspect, the value of the bit (0 or 1) indicates the state of the STAs 106. In another aspect, presence of the bit in the paging message 302c (e.g., whether the paging message 302c includes the bit or not) indicates the state of the STAs 106.

Accordingly, based on the above messaging schemes and techniques, low overhead paging may be achieved in the wireless communication network 100.

Figure 5:
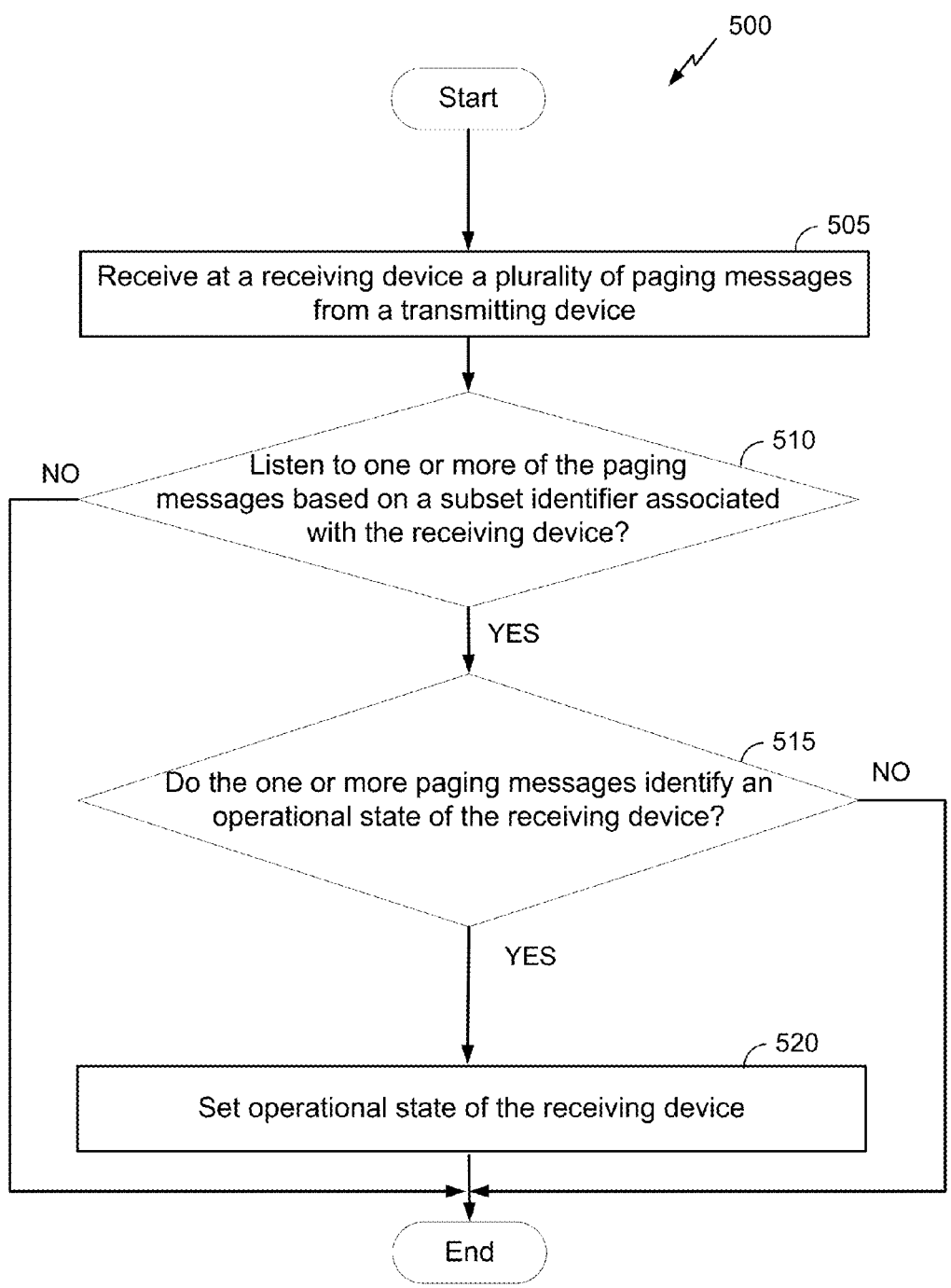
FIG. 5 is a flowchart of a process for determining an operational state of a wireless device in the wireless communication system of FIG. 1.

FIG. 5 is a flowchart of a process 500 for determining an operational state of a wireless device in the wireless communication system of FIG. 1. At a block 505, the STA 106 receives a plurality of paging messages 302 from the AP 104. Further, at a block 510, the STA 106 determines whether it should listen to one or more paging messages 302 of the plurality of paging messages 302 based on the techniques described herein. For example, the STA 106 may make the determination based on a PS ID subset identifier included in the paging message, a sequence number n of the paging message, or a time interval the paging message was transmitted. If at the block 510, the STA 106 determines it should not listen to one or more paging messages 302, the process 500 ends. If at the block 510, the STA 106 determines it should listen to one or more paging messages 302, the process continues to block 515. At the block 515, the STA 106 determines whether the one or more paging messages identifies an operational state of the STA 106 based on the techniques described herein. For example, the STA 106 may make the determination based on a bitmap included in the paging message, an identifier of STAs 106 included in the paging message, or based on the paging message including no explicit indicator. If at the block 515, the STA 106 determines the one or more paging messages does not identify an operational state of the STA 106, the process 500 ends. If at the block 515, the STA 106 determines the one or more paging messages identify an operational state of the STA 106, the process continues to a step 520. At the step 520, the STA 106 sets its operational state based on the one or more paging messages as discussed herein.

Figure 6:
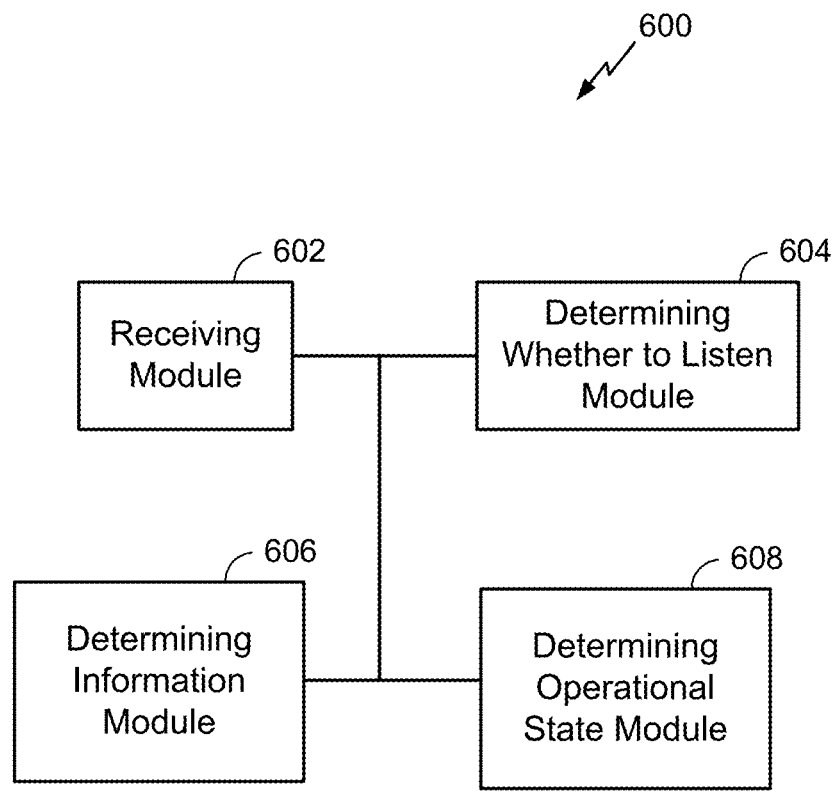
FIG. 6 is another functional block diagram of an example wireless device that may be employed within the wireless communication system of FIG. 1.

FIG. 6 is another functional block diagram of an example wireless device 600 that may be employed within the wireless communication system 100. The device 600 includes a receiving module 602 for receiving a plurality of paging messages 302 from another wireless device such as the AP 104. The receiving module 602 may be configured to perform one or more of the functions discussed above with respect to the block 505 illustrated in FIG. 5. The receiving module 602 may correspond to the receiver 212. The device 600 further includes a determining whether to listen module 604 for determining whether to listen to one or more paging messages 302 of the plurality of paging messages 302 based on the techniques described herein. The determining whether to listen module 604 may be configured to perform one or more of the functions discussed above with respect to the block 510 illustrated in FIG. 5. The determining whether to listen module 604 may correspond to the processor 204 and/or the DSP 220. The device 600 further includes a determining information module 606 for determining whether the one or more paging messages identifies an operational state of the device 600 based on the techniques described herein. The determining information module 606 may be configured to perform one or more of the functions discussed above with respect to the block 515 illustrated in FIG. 5. The determining information module 606 may correspond to the processor 204 and/or the DSP 220. The device 600 further includes a determining operational state module 608 for setting the operational state of the device 600. The determining operational state module 608 may be configured to perform one or more of the functions discussed above with respect to the block 520 illustrated in FIG. 5. The determining operational state module 608 may correspond to the processor 204 and/or the DSP 220.

As discussed above, in some aspects PS IDs and PS ID subsets may be assigned and formed by the AP 104. The AP 104 may make such assignments and formations in based on information from the STA 106 about when the STA 106 requests such pages. This may lead to significant overhead at the AP 104 for performing such scheduling to accommodate requests of multiple STAs 106.

In some aspects, additionally or alternatively, the AP 104 may transmit paging messages for particular PS IDs at specific time intervals. For example, the paging message 302a comprising a bitmap of particular PS IDs may be transmitted at specific timer intervals. Different paging messages 302a may include bitmaps for different PS IDs and may be transmitted at different intervals. For example, a first paging message 302a may include a bitmap for a first PS ID subset (e.g., PS IDs 1-32). The first paging message may be transmitted every beacon interval. Further, a second paging message 302a may include a bitmap for a second PS ID subset (e.g., PS IDs 33-64). The second paging message may be transmitted every two beacon intervals. Further, a third paging message 302a may include a bitmap for a third PS ID subset (e.g., PS IDs 65-98). The third paging message may be transmitted every two beacon intervals plus in the beacon interval following the every two beacon intervals. An STA 106 may then request a PS ID from the AP 104 (e.g., a PS ID in either the first, second, or third PS ID subset) that is transmitted according to a particular schedule (e.g., interval schedule). Accordingly, the STA 106 can request a particular paging message transmission schedule by in effect choosing from a finite group of schedules. This information can further be used as a timing source for the STA 106, and reduces overhead at the AP 104. In some aspects, if none of the finite group of schedules is appropriate for the STA 106, the STA 106 may request scheduling from the AP 104 as discussed above.

As discussed above, after receiving a paging message from the AP 104 indicating the AP 104 has data for the STA 106, the STA 106 may send a polling message to the AP 104 in order to receive the data from the AP 104. In some aspects, multiple STAs 106 may be paged by the AP 104 as discussed above. Accordingly, the multiple STAs 106 may contend for one or more communication channels with the AP 104 in order to transmit the polling messages to the AP 104. If several STAs 106 attempt to send polling messages to APs such as the AP 104 at the same time, the polling messages may collide. Accordingly, in some aspects, the schedule of when the STA 106 transmits a polling message may be based on the PS ID of the STA 106 and/or the PS ID subset(s) to which the STA 106 belongs in order to reduce the likelihood of collisions as discussed below.

In one aspect, an STA 106 after receiving a paging message indicating that the AP 104 has data for the STA 106, may determine when to poll the AP 104 for data based on the PS ID of the STA 106.

For example, as discussed above with respect to FIG. 4a, the paging message 302a includes a bitmap of N bits (where N is any positive integer). Each bit in the bitmap may correspond to a particular PS ID or STA 106 of the STAs 106 that are associated with the PS ID subset(s) associated with the paging message 302a. Further, the value of each bit (e.g., 0 or 1) may indicate the state the corresponding STA 106 with such a PS ID should be in (e.g., doze or awake). STAs 106 with associated with a bit having a value of 1 may determine the AP 104 has data to transmit to the STA 106 based on the bit value. Further, the STA 106 may determine a time to poll the AP 104 based on the position of the bit corresponding to the STA 106 (i.e., the PS ID of the STA 106) in the bitmap. For example, if the bit associated with the STA 106 is the x bit, the STA 106 may poll the AP 104 at a time based on a function of x (e.g., x*n µs after receiving the paging message 302a, where n is any positive integer). In another example, the STA 106 may determine a time to poll the AP 104 based on a hash function of the PS ID (e.g., a hash of the PS ID and the timestamp of the paging message 302a).

In another aspect, the STA 106 may determine a time to start contending for a channel to transmit a polling message to the AP 104 based on the PS ID, as opposed to determining an exact time to poll the AP 104. For example, if the bit associated with the STA 106 is the x bit, the STA 106 may contend for the channel at a time based on a function of x (e.g., x*n μs after receiving the paging message 302a, where n is any positive integer). In another example, the STA 106 may determine a time to contend for the channel based on a hash function of the PS ID (e.g., a hash of the PS ID and the timestamp of the paging message 302a).

In yet another aspect, the STA 106 may use a backoff counter (similar to the backoff counter of the IEEE 802.11 standard) to determine when to transmit a polling message to the AP 104. For example, the STA 106 may countdown a backoff counter from a starting value, and when the counter reaches 0 the STA 106 may transmit the polling message. The STA 106 may also determine if the channel is active (there is traffic on the channel) or the channel is idle (there is no traffic on the channel) while counting down. If the channel is active, the STA 106 may freeze the countdown until the channel is idle again. The STA 106 may determine the starting value of the backoff counter based on the PS ID. For example, if the bit associated with the STA 106 is the x bit, the STA 106 may set the backoff counter at a value based on a function of x (e.g., x*n μs after receiving the paging message 302a, where n is any positive integer). In another example, the STA 106 may set the backoff counter at a value based on a hash function of the PS ID (e.g., a hash of the PS ID and the timestamp of the paging message 302a).

The use of PS IDs and PS ID subsets for transmitting and receiving paging messages as discussed above may be performed through message exchange between the STAs 106 and the AP 104. The messages may take a variety of different formats. Below are described some of the formats that different messages may take and the usage of such messages with respect to the aspects described herein.

Figures 7A, 7B, 7C:
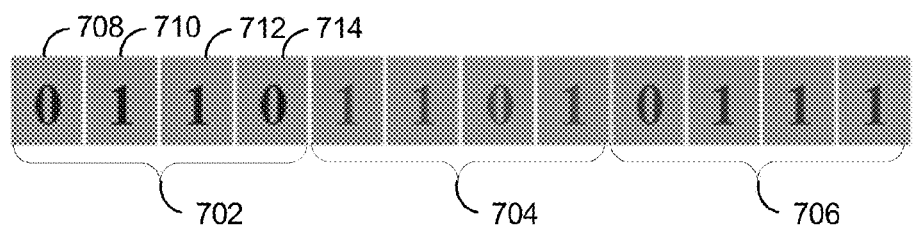
FIGS. 7a-7c illustrate an example process for compressing a bitmap such as a traffic indication message (TIM).

FIGS. 7a-7c illustrate an example process for compressing a bitmap, such as a TIM. The TIM may be associated with a plurality of receiver identifiers, and each of the plurality of receiver identifiers may be associated with at least one receiver of a set of receivers. The TIM may correspond to or function as the TIMs discussed in this disclosure. The example process of FIGS. 7a-7c may advantageously reduce the header size and bitmap size when transmitting a paging message.

In FIG. 7a, an uncompressed bitmap is shown. The illustrated aspect shows an uncompressed TIM that includes a total of 16 bits where each bit has a value of either 0 or 1, having the values of 0100011000100110. Of the 16 total bits of the uncompressed TIM, six of the bits have a value of 1 and ten have a value of 0. The uncompressed TIM may be characterized as a mid-density TIM since approximately 10% to 40% of the bits are 1, or specifically 37.5% in the illustrated aspect. In some aspects, a TIM may be characterized as a mid-density TIM where approximately 10% to 40% of the bits are instead equal to a value of 0. In some aspects, a TIM may be characterized as a mid-density TIM where 40% to 50% of the bit values are equal to a value of 1 or 40% to 50% of the bit values are equal to a value of 0.

FIG. 7b illustrates a reorganized presentation of the uncompressed TIM of FIG. 7a. FIG. 7b shows a four-by-four table that has been filled with bit values from the uncompressed TIM of FIG. 7a left-to-right by row and row-to-row from the top row to the bottom row. In some aspects, additional values (e.g., additional 0's) may be added to the end of the uncompressed TIM of FIG. 7a so that the bits of the uncompressed TIM fill every cell of table of FIG. 7b.

FIG. 7c illustrates a compressed TIM corresponding to the TIMs of FIGS. 7a-7b. The compressed TIM of FIG. 7c comprises a block bitmap 702 and a plurality of sub-block bitmaps 704, 706. Each bit of the block bitmap 702 includes a logical OR of every n-th bit (e.g., 4th bit) of the bitmap of the TIM of FIG. 7a or of every bit of one column of the TIM of FIG. 7b. The logical OR operation results in a value of 1 when any of input values are equal to 1 and results in a value of 0 when no input values are equal to 1. In the illustrated aspect, the block bitmap 702 has values equal to 0110.

The illustrated aspect in FIG. 7c includes two sub-block bitmaps 704, 706. Each sub-block bitmap corresponds to a bit of the block bitmap 702, and each sub-block bitmap corresponds to a first bit value (e.g., a value of 1) and not a second bit value (e.g., a value of 0) of the block bitmap. Each sub-block bitmap may include every n-th bit (e.g., 4th bit) of the bitmap beginning with an m-th bit of the bitmap. A value of m for each sub-block may correspond to a m-th bit of the block bitmap 702. For example, since bit 708 has a value equal to 0, bit 708 may denote that every 4th bit of the bitmap of FIG. 7a beginning with the 1st bit of the bitmap has a value equal to 0. Similarly, since bit 714 has a value equal to 0, bit 714 may denote that every 4th bit of the bitmap of FIG. 7a beginning with the 4th bit of the bitmap has a value equal to 0. Further, bit 710 is the 2nd bit of block bitmap 702, and bit 710 may denote the inclusion of sub-block bitmap 704 that includes every 4th bit of the bitmap of FIG. 7a beginning with the 2nd bit of the bitmap. Bit 712 is the 3rd bit of block bitmap 702, and bit 712 may denote the inclusion of sub-block bitmap 706 that includes every 4th bit of the bitmap of FIG. 7a beginning with the 3rd bit of the bitmap.

Advantageously, the value of n may be varied to obtain different compressions for different TIMs or for different portions of the same TIMs. An optimized n value may be used or selected so that the TIM has a greatest compression or given minimum compression. In some aspects, the value of n may be an integer greater than or equal to 1 and less than or equal to 16. In some aspects, the value of n may be equal to 0 or be a value greater than 16. Moreover, advantageously, the compressed TIM may not require different modes of operation or compression since varying the value of n may sufficiently control the compression options for a compressed TIM. In some aspects, the compressed TIM may further be compressed a second time or more times using the same or a different compression methods.

In some aspects, the value of n may vary based on a number of active devices in a wireless communication system and/or a total number of devices in the wireless communication system. A ratio of the total number of devices and the number of active devices may be determined. In some aspects, if the ratio equals or exceeds 2, the bits of the bitmap or TIM may be flipped so that each 0 value bit is inverted to a 1 value bit and each 1 value bit is inverted to a 0 value bit, and the process may be repeated again to determine a value of n. If the ratio does not equal or exceed 2, it may be determined whether the ratio exceeds a value of 4. If the ratio exceeds 4, the value of n may equal the square root of the ratio. If the ratio equals or is below 4, the value of n may equal 1. In some aspects, the value of n may be determined using on a look-up table (e.g., a 1×16 table) based the ratio, advantageously saving processing power or time. In some aspects, the value of n may be calculated based on the ratio.

Advantageously, the total number of sub-block bitmaps in a paging message may be varied to obtain different compressions for the same bitmap or TIM or for different bitmaps or TIMs. As a result, an optimized total number may be used or selected so that the bitmaps or TIMs have a greatest compression or given minimum compression. In some aspects, the total number of sub-block bitmaps may be an integer greater than or equal to 1 and less than or equal to 1024. In some aspects, the total number of sub-block bitmaps may be equal to 0 or be a value greater than 1024. Further, in some aspects, the total number of sub-blocks may be determined based on the value of n. In some aspects, the total number of sub-blocks may be determined based on a first active device and a last active device in a wireless communication system.

In some aspects, other methods may be used to group bits, rather than choosing every nth bit from a TIM or bitmap. For example, rather than choosing every nth bit of the original TIM contained in FIG. 7a, instead, the method may divide the original TIM into a number of sections, such as 2, 4, 6, 7, or 9 sections. In some embodiments, it may be preferable to divide the original TIM or bitmap into $2^n$ sections, where n is a positive integer. For example, the original TIM may be divided into four sections, such that the first section may contain the first four bits (0100), and the next section may contain the next four bits (0110), and so on. Similarly, rather than dividing an original TIM into a certain number of sections, the original TIM may instead be divided into sections, where each section is a fixed number of bits, such as 2, 3, 5, 8, or 11 bits. For example, the original TIM may be divided into sections each containing 5 bits, such that the sections may comprise 01000, 11000, 10011, and 0. In some embodiments, it may be preferable to divide the original TIM or bitmap into sections containing $2^n$ bits, where n is a positive integer. In some embodiments, it may be beneficial, when dividing the original TIM into sections under either of these methods, to add a number of trailing zeros. For example, if the original TIM is to be divided into four sections, it may be beneficial to ensure that the number of bits in the original TIM is divisible by four. Thus, in some embodiments, it may be beneficial to add a number of bits to the start or end of the bitmap to be encoded, in order to increase the size of the bitmap to be a more evenly divisible number. In some embodiments, it may be beneficial if the added bits are 0s.

In some aspects, the compression of the bitmap may be done in an iterative manner. For example, a bitmap or TIM may first be divided into a number of sections, such as two sections. Each section may be coded as above, where if each bit in the section is a 0, the method may output a 0, while if the section contains a non-zero bit, the method may output a 1. The method may code each section in this matter. For example, for the Original TIM in FIG. 7a, the method may divide this TIM into two sections—01000110 and 00100110. Each of these sections may be coded as a 1, since each section contains one or more non-zero bits. After coding each initial section, two in this example, the method may then divide each section which was coded as a 1 into a number of sections, such as two sections. So, for example, the first section may be divided into 0100 and 0110, and each of these sections may be coded, as before. The second section may be similarly divided into 0010 and 0110, and coded accordingly. This iterative compression process may be done any number of times before the method may print out all remaining bits. For example, this iterative process may be done 2, 3, 4, or 7 times. In some embodiments, the iterative process may continue until each sub-section is a certain predefined number of bits, or until a predefined number of iterations are complete. For example, the compression of the bitmap may continue to divide each non-zero subsection in two parts, as before, until a subsection contains only 2, 3, 4, or 8 bits. This process may divide each section of the bitmap or TIM into any number of sub-sections. For example, as above, this process may divide the bitmap or TIM into two sections, and then subdivide each non-zero section into two further sections. This process may divide a TIM into any number of sections, and may subdivide each section into any number of subsections. For example, this process may initially divide the bitmap or TIM into four sections, and may then subdivide each non-zero section into two subsections.

In some aspects, it may be beneficial if each of these sections is of an equal size. It may be beneficial if the bitmap or TIM is $2^n$ bits, where n is an integer larger than 1. It may be beneficial if the bitmap or TIM is divided or subdivided into a power of 2, such as 2, 4, 8 or 16 sections. This use of powers of 2 may allow the method to run more efficiently, and may allow the method to more easily evenly divide a bitmap or TIM, or a subsection of a bitmap or TIM in order to run iteratively. In some embodiments, the method may divide a TIM or bitmap into a number of sections based, at least in part, on the number of bits in the bitmap and/or the number of non-zero bits in the bitmap. Thus, in some aspects, if may be beneficial to add a number of trailing zeros to the bitmap, in order to ensure that the bitmap is a size that may be more optimal for this manner of iterative compression.

In some embodiments, it may be beneficial to alter the compression of the bitmap based upon the expected density of nonzero bits in the bitmap, or based upon the size of the bitmap. For example, if only a small number of non-zero bits are present in the bitmap, better compression may be achieved by dividing the bitmap into larger sections initially. Conversely, if a relatively large number of non-zero bits are present in the bitmap, better compression may be achieved by dividing the bitmap into relatively smaller sections initially.

Figure 8:
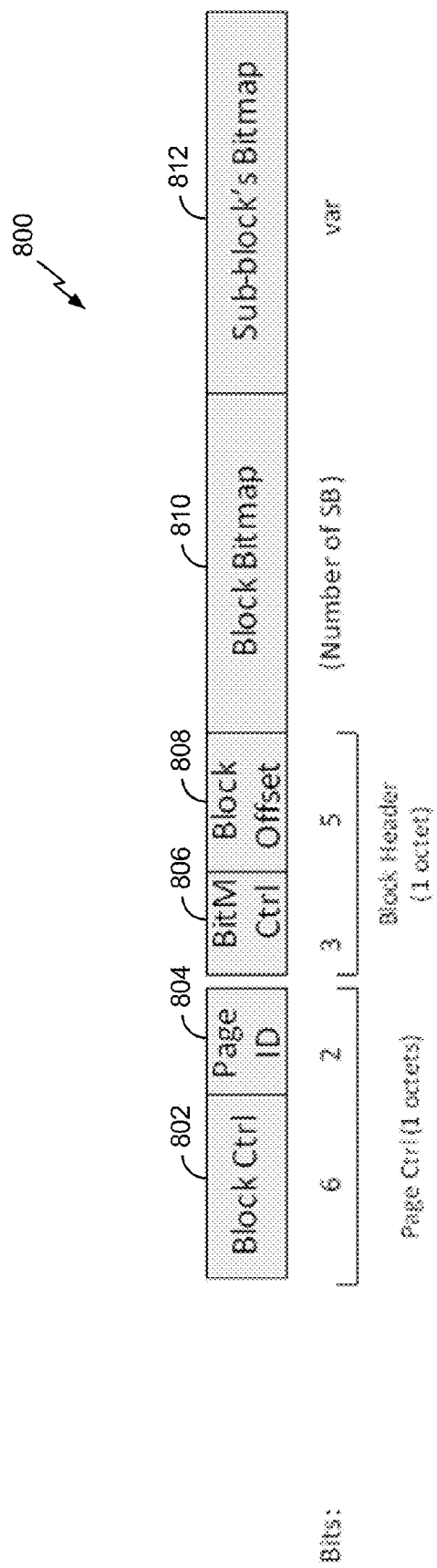
FIG. 8 illustrates an example frame format including a compressed TIM.

FIG. 8 illustrates an example frame format 800 including a compressed TIM. The frame format may be included as part of a paging message. The frame format 800 includes a block control field 802 having 6 bits, a page identifier (ID) 804 having 2 bits, a bit m control field 806 having 3 bits, a block offset field 808 having 5 bits, a block bitmap field 810, and a sub-block bitmaps field 812. The frame format 800 may permit compression of a TIM using the block bitmap field 810 and sub-block bitmaps field 812 as discussed with respect to FIG. 7a-7c. However, the frame format 800 may not enable the value of n to vary from one compressed TIM to another compressed TIM or TIM portion.

Figure 9:
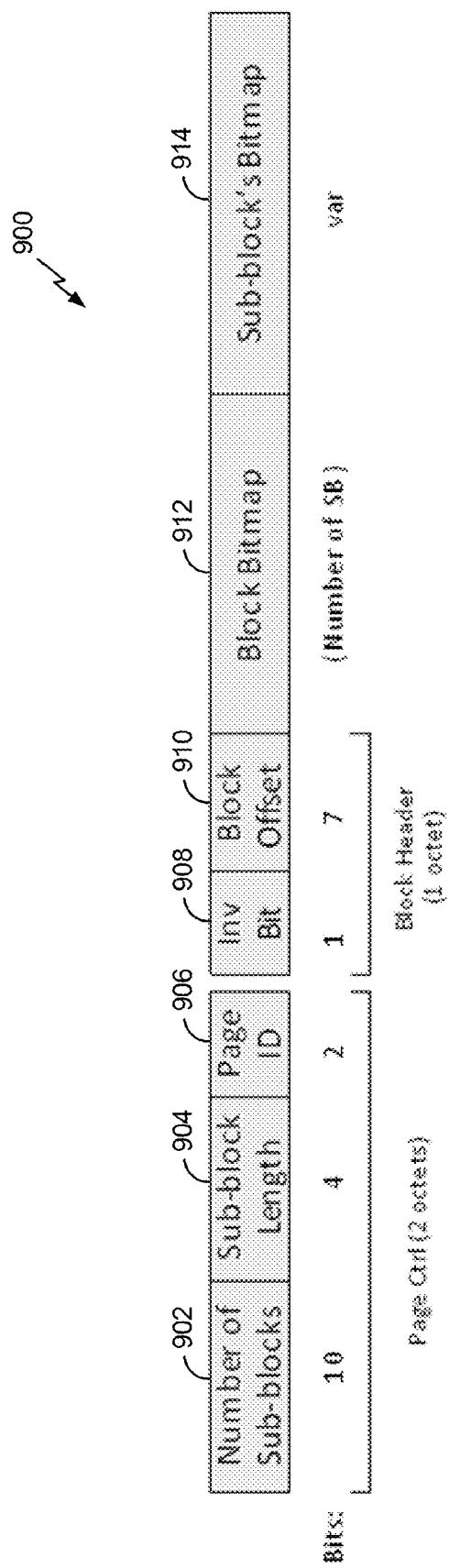
FIG. 9 illustrates another example frame format including a compressed TIM.

FIG. 9 illustrates another example frame format 900 including a compressed TIM. The frame format 900 may be included as part of a paging message, such as the paging messages discussed in this disclosure. The frame format 900 includes a number of sub-block bitmaps field 902 having 10 bits, a sub-block bitmap length field 904 having 4 bits, a page identifier 906 having 2 bits, an inverse field 908 having 1 bit, a block offset field 910 having 7 bits, a block bitmap field 912, and a sub-block bitmaps field 914. The frame format 900 may advantageously provide additional compression over frame format 800 of FIG. 8 since frame format 900 permits n and a total number of sub-block bitmaps to vary as discussed with respect to FIG. 7a-7c.

The block offset field 910 may be configured to indicate a first receiver identifier corresponding to a first bit of the block bitmap. The inverse field 908 may be configured to indicate that each 0 value bit of a compressed TIM is inverted to a 1 value bit and each 1 value bit of the compressed TIM is inverted to a 0 value bit.

Advantageously, frame format 900 may permit reduced header overhead when transmitting a paging messaging that includes a TIM. Further, frame format 900 may not require multiple modes of operation since varying n may effectively accommodate other desirable modes. For instance, in some aspects, if the sub-block bitmap length field 904 equals 1, the TIM may effectively be a bitmap. In some aspects, if the sub-block bitmap length field 904 equals 4 and the number of sub-block bitmaps field 902 equals 4, the TIM may effectively be a list of AIDs.

Figure 10:
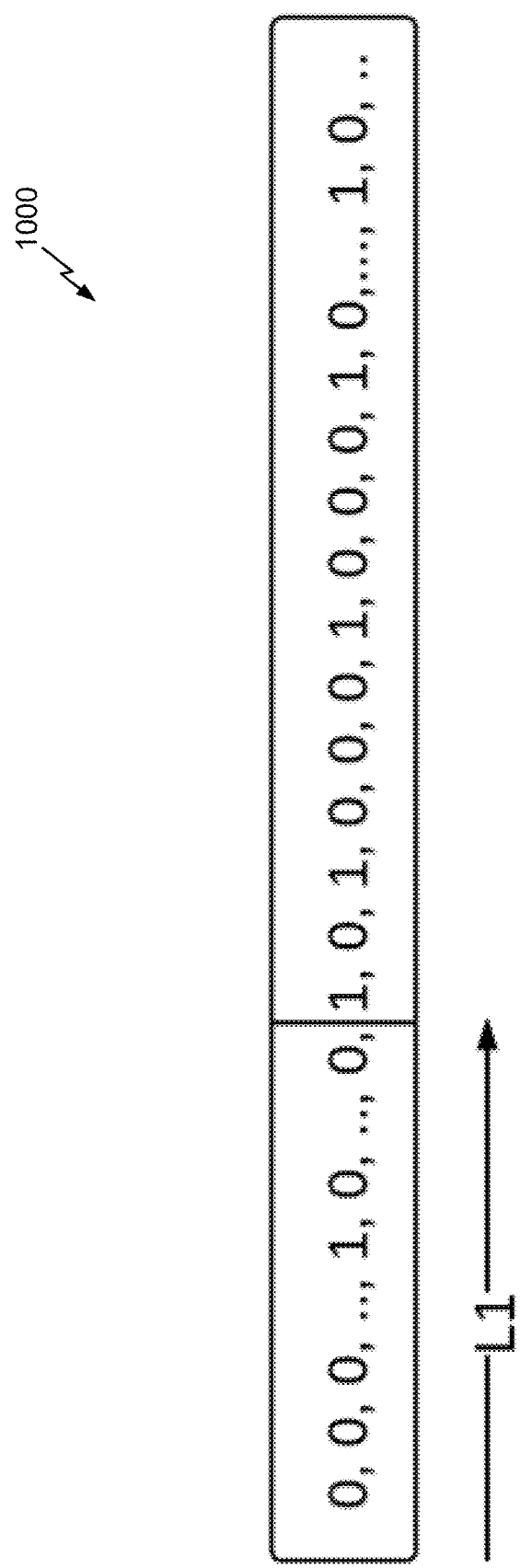
FIG. 10 illustrates an example TIM.

FIG. 10 illustrates an example uncompressed TIM 1000 that may be compressed using a window compression. The window compression may look at a first L1 bits of TIM 1000 as a first window. L1 may be chosen so that the window size L1 includes a single bit having the value of 1 in the window size L1 with a probably of 50%, and a value (e.g., a value of 1) and/or index may be encoded to the output. The window compression may then continue with the encoded window L1 removed from the bitmap and looking to a second window. Advantageously, the window compression may permit significant compression of large sequences of bits with values of 1 or bits with values of 0.

The following pseudocode illustrates operation of an encoder in accordance with aspects of the window compression:

```
Step 1. If 2K > N
        V ← V XOR 1 // if more 1s in V than 0s, may flip 1s and 0s
        Set K = N - K
Step 2. If K is 1
        d ← index of the only 1 in V
        Append d to the output
        Return
Step 3. L1 ← -1/log₂(1 - K/N), W ← V(1:L1)
        If W is 0
            Append 0 to the output
            V ← V(L1 + 1: end), N ← N - L1
            Go to Step 1
        Else
            d ← index of the first 1 in W, encoded in log₂ L1 bits
            Append (1, d) to the output
            V ← V(d + 1: end), N ← N - d, K ← K -1
            Go to Step 1,
``` where L1 is the window size, K is the number of active users in a wireless communication system, N is the total number of users in the wireless communication system, V is an uncompressed TIM, W is 0 if the window L1 contains no bits having a value of 1, d is the index value for a bit value of 1 to be encoded.

Figure 11:
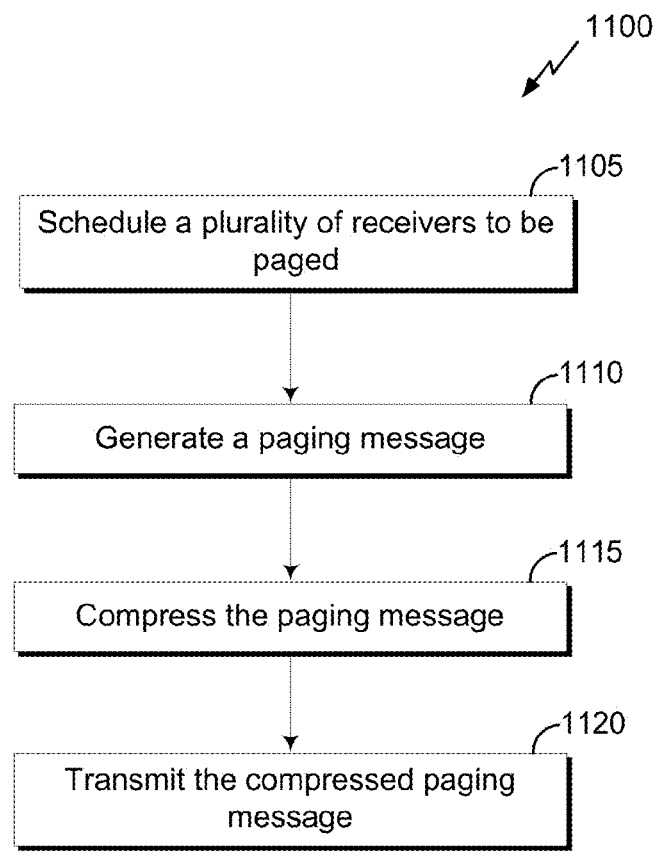
FIG. 11 illustrates an example method for processing and transmitting a paging message.

FIG. 11 illustrates an example method 1100 for processing and transmitting a paging message. At block 1105, a transmitting device (e.g., the AP 104 or an apparatus associated with the AP 104) schedules a plurality of receivers to be paged (e.g., the STAs 106). Further, at block 1110, the transmitting device generates a paging message; said paging message identifying one or more of the plurality of scheduled receivers. Further, at block 1115, the transmitting device compresses the paging message. Various methods can be employed for performing the compression as discussed in this disclosure. Further, at block 1120, the transmitting device transmits the compressed paging message to the one or more of the plurality of scheduled receivers. In certain situations (e.g., by way of example, and not limitation, with high-density bitmap, e.g. a bitmap in which the number of zeros is greatly less than the number of ones) the transmitting device can choose a fraction (or subgroup, or subset) of the plurality of receivers to be paged for inclusion in the paging message. The method 1100 as illustrated in FIG. 11 may coexist with any of the methods and processes discussed in this disclosure.

Also, all or part of method 1100 as illustrated in FIG. 11 may be combined with any of the methods or processes discussed herein.

Figure 12:
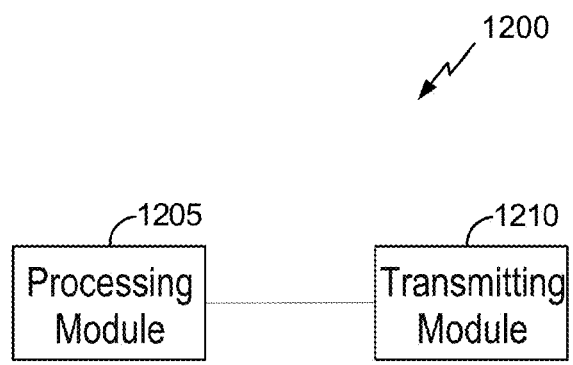
FIG. 12 is a functional block diagram of an example wireless device that may be employed within the wireless communication system 100 of FIG. 1.

FIG. 12 is a functional block diagram of an example wireless device 1200 that may be employed within the wireless communication system 100 of FIG. 1. The wireless device 1200 comprises a processing module 1205 for scheduling a plurality of receivers to be paged, generating a paging message, and compressing the paging message. The processing module 1205 may be configured to perform one or more of the steps discussed above with respect to blocks 1105, 1110, 1115 of FIG. 11. The processing module 1205 may correspond to one or more of the processor 204 and the DSP 220 of FIG. 2. The wireless device 1200 further comprises a transmitting module 1210 for transmitting the compressed paging message. The transmitting module 1210 may be configured to perform one or more of the steps discussed above with respect to block 1120 of FIG. 11. The transmitting module 1210 may correspond to the transmitter 210 of FIG. 2.

Moreover, in one aspect, means for compressing a bitmap of a paging message to obtain a compressed paging message may comprise the processing module 1205. In another aspect, means for transmitting the compressed paging message may comprise the transmitting module 1210.

Figure 13:
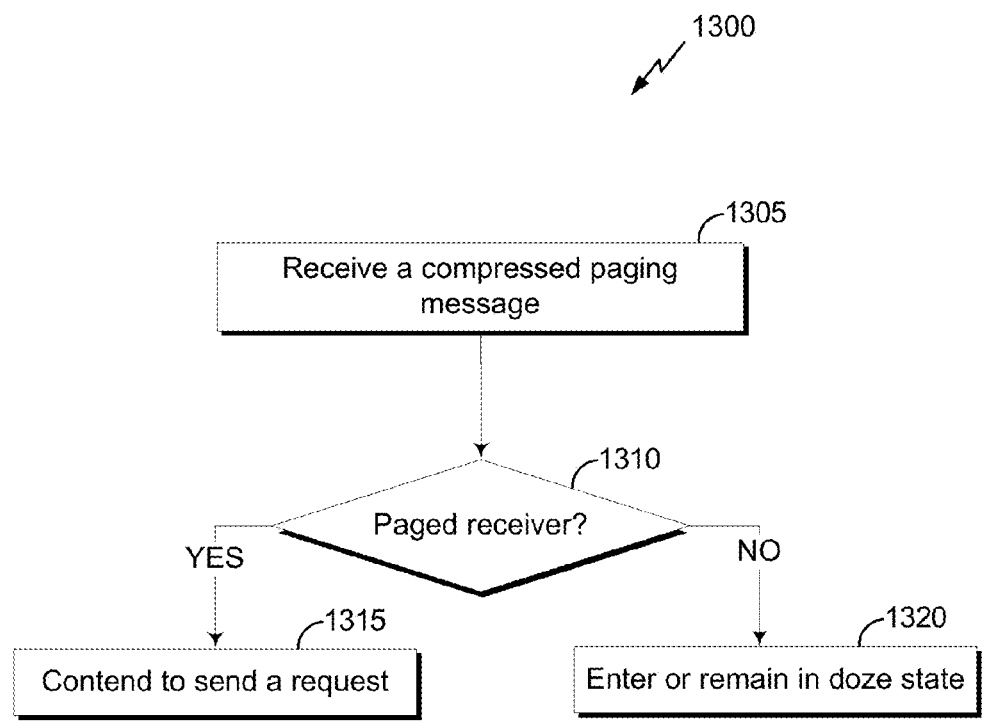
FIG. 13 is a flowchart of an example method for receiving and processing a compressed paging message.

FIG. 13 is a flowchart of an example method 1300 for receiving and processing a compressed paging message. At block 1305, a compressed paging message is received by a receiving device from a transmitter. The compressed paging message includes a compressed bitmap that includes a block bitmap and a plurality of sub-block bitmaps. The reception may be performed by the receiver 212 of FIG. 2.

At block 1310, the receiving device determines whether the transmitting device is paging the receiving device via the compressed paging message. For example, a wireless device may be configured to receive a paging message comprising the frame format 900 of FIG. 9. The device may accordingly determine whether a bit of the block bitmap and/or sub-block bitmaps corresponds to the device. If no bit of the block bitmap corresponds to the device (e.g., offset+AID modulo 'number of sub-block bitmaps'), the device is configured to enter or remain in a doze state at block 1320. Further, if a bit in the block bitmap corresponds to the device and a sub-block bitmap bit value (e.g., 'length of block bitmap'*n+ 'AID\number of sub-block bitmaps') has a first value (e.g., a value of 0) and not a second value (e.g., a value of 1) that corresponds to the device, the device is configured to enter or remain in a doze state at block 1320. If the a bit in the block bitmap corresponds to the device and a sub-block bitmap bit value has a second value (e.g., a value of 1) and not a first value (e.g., a value of 0) that corresponds to the device, the device is configured to contend to send a message to the transmitting device. For instance, the device may contend to transmit a polling message to receive traffic pending at an AP. The processing may be performed by the processor 204 of FIG. 2 and/or the DSP 220 of FIG. 2, for example.

Figure 14:
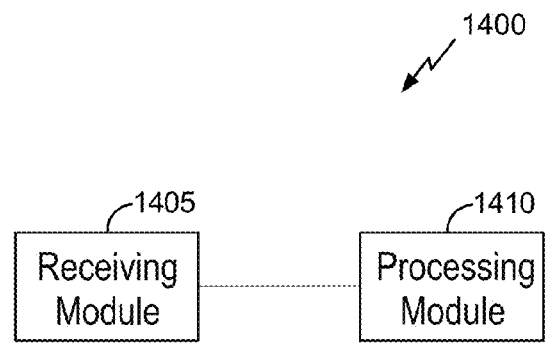
FIG. 14 is a functional block diagram of an example wireless device that may be employed within the wireless communication system 100 of FIG. 1.

FIG. 14 is a functional block diagram of an example wireless device 1400 that may be employed within the wireless communication system 100 of FIG. 1. The wireless device 1400 comprises a receiving module 1405 configured to receive a compressed paging message. The receiving module 1405 may be configured to perform one or more of the steps discussed above with respect to block 1305 of FIG. 13. The receiving module 1405 may correspond to the receiver 212 of FIG. 2. The wireless device 1400 further comprises a processing module 1410 configured to determine whether a bit of the block bitmap and/or sub-block bitmaps corresponds to the device and whether the wireless device 1400 has been paged.

The processing module 1410 is further configured to contend to send a polling message if the wireless device 1400 has been paged and to enter or remain in a doze state if the wireless device 1400 has not been paged. The processing module 1410 may correspond to the processor 204 of FIG. 2 and/or the DSP 220 of FIG. 2, for example.

Moreover, in one aspect, means for receiving a compressed paging message may comprise the receiving module 1405. In another aspect, means for processing the paging message may comprise the processing module 1410.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless communications device comprising:
   a processor configured to compress a bitmap of a paging message to obtain a compressed paging message comprising a compressed bitmap, each bit in the bitmap indicating state for one or more receivers, the compressed bitmap comprising a block bitmap and a sub-block bitmap for each bit of the block bitmap with a particular value, wherein each bit of the block bitmap comprises a logical OR of a different subset of the bitmap; and
   a transmitter electronically coupled with the processor and configured to transmit the compressed paging message to at least one receiver.

2. The wireless communications device of claim 1, wherein each different subset of the bitmap is comprised of a non-repeating set of n-th bits, each non-repeating set starting from a different offset of the bitmap.

3. The wireless communications device of claim 1, wherein each subset of the bitmap comprises consecutive bits of the bitmap.

4. The wireless communications device of claim 1, wherein the processor is further configured to form the subsets of the bitmap, at least in part, by dividing the bitmap into sections.

5. The wireless communications device of claim 1, wherein one or more sub-block bitmaps comprise a second-level block bitmap and a plurality of second-level sub-block bitmaps, each bit of the second-level block bitmap comprises a logical OR of a subset of the corresponding subset of the block bitmap and each second-level sub-block bitmap corresponding to a bit of the second-level block bitmap.

6. The wireless communications device of claim 2, wherein the processor is configured to determine a value of n.

7. The wireless communications device of claim 6, wherein the processor is configured to determine the value of n to be an integer greater than or equal to 1 and less than or equal to 16.

8. The wireless communications device of claim 6, wherein the processor is further configured to determine the value of n based on a number of active devices in a wireless communication system and a total number of devices in the wireless communication system.

9. The wireless communications device of claim 8, wherein the processor is further configured to determine the value of n using a look-up table.

10. The wireless communications device of claim 8, wherein the processor is further configured to calculate the value of n based on a ratio of the number of active devices and the total number of devices.

11. The wireless communications device of claim 6, wherein each sub-block bitmap corresponds to a first bit value and not a second bit value of bits of the block bitmap, and each sub-block bitmap comprises every n-th bit of the bitmap beginning with an m-th bit of the bitmap, a value of m for each sub-block corresponding to a m-th bit of the block bitmap.

12. The wireless communications device of claim 11, wherein the processor is configured to determine a total number of sub-block bitmaps for the compressed bitmap.

13. The wireless communications device of claim 12, wherein the total number of sub-block bitmaps is configured to be an integer greater than or equal to 1 and less than or equal to 1024.

14. The wireless communications device of claim 12, wherein the processor is further configured to determine the total number of sub-block bitmaps based on the value of n.

15. The wireless communications device of claim 14, wherein the processor is further configured to determine the total number of sub-block bitmaps based on a first active device and a last active device in a wireless communication system.

16. The wireless communications device of claim 1, wherein the compressed paging message comprises a block offset field configured to indicate a first receiver identifier corresponding to a first bit of the block bitmap.

17. The wireless communications device of claim 1, wherein the compressed paging message comprises an inverse field configured to indicate that each 0 value bit of the compressed bitmap is inverted to a 1 value bit and each 1 value bit of the compressed bitmap is inverted to a 0 value bit.

18. The wireless communications device of claim 1, wherein the compressed paging message comprises a number of sub-block bitmaps field, a sub-block bitmap length field, and a page identifier field.

19. The wireless communications device of claim 1, wherein the processor is configured to generate the paging message based on a scheduling of one or more of the receivers.

20. The device of claim 1, wherein each sub-block bitmap indicates values for each bit in a corresponding subset of the bitmap, wherein the logical or of the values is the particular value, and each bit of the block bitmap that corresponds to one of the subsets is set to the particular value.

21. A wireless communications device comprising:
    a receiver electronically coupled with a processor and configured to receive a compressed paging message from a transmitter; and
    a processor configured to process a compressed bitmap of the compressed paging message, each bit in the bitmap indicating state for one or more receivers, the compressed bitmap comprising a block bitmap and a sub-block bitmap for each bit of the block bitmap with a particular value, wherein each bit of the block bitmap comprises a logical OR of a different subset of the bitmap.

22. The wireless communications device of claim 21, wherein each different subset of the bitmap is comprised of a non-repeating set of n-th bits, each non-repeating set starting from a different offset of the bitmap.

23. The wireless communications device of claim 21, wherein each subset of the bitmap comprises consecutive bits of the bitmap.

24. The wireless communications device of claim 21, wherein one or more sub-block bitmaps comprise a second-level block bitmap and a plurality of second-level sub-block bitmaps, each bit of the second-level block bitmap comprises a logical OR of a subset of the corresponding subset of the block bitmap and each second-level sub-block bitmap corresponding to a bit of the second-level block bitmap.

25. The wireless communications device of claim 21, wherein the processor is configured to determine whether a bit of the block bitmap corresponds to the wireless communications device.

26. The wireless communications device of claim 25, wherein the processor is configured to enter or remain in a doze state if no bit of the block bitmap corresponds to the wireless communications device.

27. The wireless communications device of claim 25, wherein the processor is configured to determine whether a bit of one or more of the sub-block bitmaps corresponds to the wireless communications device.

28. The wireless communications device of claim 27, wherein the processor is configured to enter or remain in a doze state if the bit of the one or more of the sub-block bitmaps corresponds to the wireless communications device and a value of the bit is a first value and not a second value.

29. The wireless communications device of claim 27, wherein the processor is configured to contend to transmit a polling message if the bit of the one or more of the sub-block bitmaps corresponds to the wireless communications device and a value of the bit is a second value and not a first value.

30. The wireless communications device of claim 21, wherein the compressed paging message comprises a block offset field configured to indicate a first receiver identifier corresponding to a first bit of the block bitmap.

31. The wireless communications device of claim 21, wherein the compressed paging message comprises an inverse field configured to indicate that each 0 value bit of the compressed bitmap is inverted to a 1 value bit and each 1 value bit of the compressed bitmap is inverted to a 0 value bit.

32. The wireless communications device of claim 21, wherein the compressed paging message comprises a number of sub-block bitmaps field, a sub-block bitmap length field, and a page identifier field.

33. A method for wireless communications comprising:
compressing a bitmap of a paging message to obtain a compressed paging message, each bit in the bitmap indicating state for one or more receivers, the compressed bitmap comprising a block bitmap and a sub-block bitmap for each bit of the block bitmap with a particular value, each bit of the block bitmap comprises a logical OR of a different subset of the bitmap; and
transmitting the compressed paging message to at least one receiver.

34. The method of claim 33, further comprising compressing a second-level bitmap corresponding to a sub-block bitmap, the compressed second-level bitmap comprising a second-level block bitmap and a plurality of second-level sub-block bitmaps, each bit of the second-level block bitmap comprises a logical OR of a subset of the corresponding subset of the block bitmap and each second-level sub-block bitmap corresponding to a bit of the second-level block bitmap 35. The method of claim 33, further comprising determining a value of n.

36. The method of claim 35, wherein the value of n is configured to be an integer greater than or equal to 1 and less than or equal to 16.

37. The method of claim 35, further comprising determining the value of n based on a number of active devices in a wireless communication system and a total number of devices in the wireless communication system.

38. The method of claim 37, further comprising determining the value of n using a look-up table.

39. The method of claim 37, further comprising calculating the value of n based on a ratio of the number of active devices and the total number of devices.

40. The method of claim 35, wherein each sub-block bitmap comprises consecutive bits of the bitmap.

41. The method of claim 35, wherein each sub-block bitmap corresponds to a first bit value and not a second bit value of bits of the block bitmap, and each sub-block bitmap comprises every n-th bit of the bitmap beginning with an m-th bit of the bitmap, a value of m for each sub-block corresponding to a m-th bit of the block bitmap.

42. The method of claim 41, further comprising determining a total number of sub-block bitmaps for the compressed bitmap.

43. The method of claim 42, wherein the total number of sub-block bitmaps is configured to be an integer greater than or equal to 1 and less than or equal to 1024.

44. The method of claim 42, further comprising determining the total number of sub-block bitmaps based on the value of n.

45. The method of claim 44, further comprising determining the total number of sub-block bitmaps based on a first active device and a last active device in a wireless communication system.

46. The method of claim 33, wherein the compressed paging message comprises a block offset field configured to indicate a first receiver identifier corresponding to a first bit of the block bitmap.

47. The method of claim 33, wherein the compressed paging message comprises an inverse field configured to indicate that each 0 value bit of the compressed bitmap is inverted to a 1 value bit and each 1 value bit of the compressed bitmap is inverted to a 0 value bit.

48. The method of claim 33, wherein the compressed paging message comprises a number of sub-block bitmaps field, a sub-block bitmap length field, and a page identifier field.

49. The method of claim 33, further comprising generating the paging message based on a scheduling of one or more receivers of the set of receivers.

50. A method for wireless communications comprising:
receiving, via a wireless communications device, a compressed paging message from a transmitter; and
processing a compressed bitmap of a compressed paging message, the compressed bitmap comprising a block bitmap and a sub-block bitmap for each bit of the block bitmap with a particular value, each bit of the block bitmap comprises a logical OR of a different subset of the bitmap.

51. The method of claim 50, further comprising processing a compressed second-level bitmap corresponding to a sub-block bitmap, the compressed second-level bitmap comprising a second-level block bitmap and a plurality of second-level sub-block bitmaps, each bit of the second-level block bitmap comprises a logical OR of a subset of the corresponding subset of the block bitmap and each second-level sub-block bitmap corresponding to a bit of the second-level block bitmap.

52. The method of claim 50, further comprising determining whether a bit of the block bitmap corresponds to the wireless communications device.

53. The method of claim 52, further comprising entering or remaining in a doze state if no bit of the block bitmap corresponds to the wireless communications device.

54. The method of claim 52, further comprising determining whether a bit of one or more of the sub-block bitmaps corresponds to the wireless communications device.

55. The method of claim 54, further comprising entering or remaining in a doze state if the bit of the one or more of the sub-block bitmaps corresponds to the wireless communications device and a value of the bit is a first value and not a second value.

56. The method of claim 54, further comprising contending to transmit a polling message if the bit of the one or more of the sub-block bitmaps corresponds to the wireless communications device and a value of the bit is a second value and not a first value.

57. The method of claim 50, wherein the compressed paging message comprises a block offset field configured to indicate a first receiver identifier corresponding to a first bit of the block bitmap.

58. The wireless communications device of claim 50, wherein the compressed paging message comprises an inverse field configured to indicate that each 0 value bit of the compressed bitmap is inverted to a 1 value bit and each 1 value bit of the compressed bitmap is inverted to a 0 value bit.

59. The wireless communications device of claim 50, wherein the compressed paging message comprises a number of sub-block bitmaps field, a sub-block bitmap length field, and a page identifier field.

60. An apparatus for wireless communications comprising:
means for compressing a bitmap of a paging message to obtain a compressed paging message, each bit in the bitmap indicating state for one or more receivers, the compressed bitmap comprising a block bitmap and a sub-block bitmap for each bit of the block bitmap with a particular value, each bit of the block bitmap comprises a logical OR of a different subset of the bitmap; and
means for transmitting the compressed paging message to at least one receiver.

61. An apparatus for wireless communications comprising:
means for receiving a compressed paging message from a transmitter; and
means for processing a compressed bitmap of a compressed paging message, the compressed bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap.

62. A non-transitory computer storage that stores executable program instructions that direct a wireless communications device to perform a process that comprises:
compressing a bitmap of a paging message to obtain a compressed paging message, the bitmap associated with a plurality of receiver identifiers and each of the plurality of receiver identifiers associated with at least one receiver of a set of receivers, the compressed bitmap comprising a block bitmap and a plurality of sub-block bitmaps, each bit of the block bitmap comprises a logical OR of a subset of the bitmap and each sub-block bitmap corresponding to a bit of the block bitmap; and
transmitting the compressed paging message to at least one receiver.

63. A non-transitory computer storage that stores executable program instructions that direct a wireless communications device to perform a process that comprises:
receiving a compressed paging message from a transmitter; and
processing a compressed bitmap of a compressed paging message, each bit in the bitmap indicating state for one or more receivers, the compressed bitmap comprising a block bitmap and a sub-block bitmap for each bit of the block bitmap with a particular value, each bit of the block bitmap comprises a logical OR of a different subset of the bitmap.

* * * * *